United States Patent
Reiche et al.

(10) Patent No.: US 8,573,182 B2
(45) Date of Patent: Nov. 5, 2013

(54) METHOD FOR STARTING AN ENGINE AUTOMATICALLY

(75) Inventors: David Bruce Reiche, Livonia, MI (US);
Steven Wooldridge, Saline, MI (US);
Curtis McGuire, Allen Park, MI (US);
Brad Alan VanDerWege, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/612,639

(22) Filed: Sep. 12, 2012

(65) Prior Publication Data
US 2013/0006503 A1   Jan. 3, 2013

Related U.S. Application Data

(63) Continuation of application No. 13/042,719, filed on Mar. 8, 2011, now Pat. No. 8,267,067.

(51) Int. Cl.
*F02P 5/00* (2006.01)
*F02N 11/08* (2006.01)
*G06F 19/00* (2011.01)

(52) U.S. Cl.
USPC ............. 123/406.54; 123/179.4; 123/179.5; 123/406.76; 701/112; 701/113

(58) Field of Classification Search
USPC ........ 123/179.1, 179.3, 179.5, 182.1, 185.12, 123/198 D, 198 DC, 198 F, 406.18, 406.53, 123/406.58, 406.76, 179.4, 406.54; 701/102, 114, 112, 113
See application file for complete search history.

(56) References Cited

U.S. PATENT DOCUMENTS

| | | | |
|---|---|---|---|
| 5,050,555 A | 9/1991 | Mitsumoto | |
| 5,611,314 A | 3/1997 | Fuwa et al. | |
| 6,588,397 B1 | 7/2003 | Sieber | |
| 6,739,300 B2 | 5/2004 | Ackermann et al. | |
| 6,834,632 B2 | 12/2004 | Kataoka et al. | |
| 6,931,840 B2 | 8/2005 | Strayer et al. | |
| 6,938,598 B1 | 9/2005 | Lewis et al. | |
| 6,978,761 B2 | 12/2005 | Meyer | |
| 7,066,128 B2 | 6/2006 | Satake et al. | |
| 7,069,720 B2 | 7/2006 | Strayer et al. | |
| 7,177,755 B2 | 2/2007 | Nishikawa et al. | |
| 7,827,975 B1 | 11/2010 | Gibson et al. | |
| 2003/0041831 A1 | 3/2003 | Aoki et al. | |
| 2003/0176964 A1 | 9/2003 | Turner et al. | |
| 2006/0107935 A1 | 5/2006 | Masaoka et al. | |
| 2006/0196460 A1 | 9/2006 | Ohtsu et al. | |
| 2006/0266020 A1 | 11/2006 | Okamoto et al. | |
| 2008/0105230 A1 | 5/2008 | Kishibata et al. | |
| 2008/0140300 A1 | 6/2008 | Kuo et al. | |
| 2009/0020092 A1 | 1/2009 | Kishibata et al. | |
| 2009/0271095 A1 | 10/2009 | Kojima | |

FOREIGN PATENT DOCUMENTS

WO    2006070338 A1    7/2006

*Primary Examiner* — Willis R Wolfe, Jr.
*Assistant Examiner* — Johnny Hoang
(74) *Attorney, Agent, or Firm* — Julia Voutyras; Alleman Hall McCoy Russell & Tuttle LLP

(57) ABSTRACT

A method for improving starting of an engine that may be automatically started is provided. In one example, spark timing of an automatically started engine is in advance of spark timing for an operator requested engine start. The approach may reduce vehicle driveline disturbances.

20 Claims, 6 Drawing Sheets

METHOD FOR STARTING AN ENGINE AUTOMATICALLY

FIELD

The present description relates to a method for improving starting of an engine. The method may be particularly useful for engines that may be automatically started in response to engine operating conditions.

BACKGROUND AND SUMMARY

Engines may be automatically stopped and restarted automatically in the absence of an operator engine start request (e.g., an operator start request via a key or pushbutton) to conserve fuel. In one example, the engine may be stopped when predetermined conditions occur. For example, the engine may be stopped during a time when a vehicle brake pedal is depressed and when there is an absence of a driver requested engine torque. The engine may be restarted when predetermined conditions occur. For example, the engine may be restarted when the operator releases the brake pedal. However, if the engine is stopped and then restarted while a transmission of the vehicle is in a gear, the vehicle operator may experience a torque disturbance within the vehicle driveline (e.g., transmission, driveshaft, and vehicle wheels). The torque disturbance may be related to an amount of torque transmitted from the engine to the driveline via a torque converter. In particular, the torque converter may transmit torque from the engine to the vehicle driveline such that more engine torque is transmitted to the vehicle driveline at higher engine speeds.

The inventors herein have recognized the above-mentioned disadvantages and have developed a method for starting an engine, comprising: cranking the engine via a starter; and adjusting a spark timing for a cylinder of the engine to a timing retarded of top-dead-center compression stroke of the cylinder in response to a request to automatically start the engine, the spark timing for a first combustion event in the cylinder since a stop of the engine.

By providing spark to a cylinder of an engine at timing retarded of top-dead-center compression stroke it may be possible to start the engine while a transmission coupled to the engine is in drive such that the engine speed runs up to idle speed and driveline torque disturbances are reduced. In one example, spark timing is retarded such that average IMEP during a cylinder cycle is less than 4 bar. In this way, engine speed may be controlled such that the possibility of driveline torque disturbances may be reduced.

In another aspect of the present disclosure the inventors herein have provided a method for starting an engine, comprising: cranking the engine via a starter; in response to a controller requested engine start, adjusting spark timing of the engine to a first timing; and in response to an operator requested engine start, adjusting spark timing of the engine to a second timing, the second timing different than the first timing.

By providing different spark timings for controller initiated engine starts (e.g., engine starts in response to selected controller engine restart conditions being met and without an operator request to start the engine) and operator initiated engine starts (e.g., an engine restart responsive to an operator's request to restart an engine via a key-on or pushbutton input), it may be possible to limit an amount of engine torque transmitted to a vehicle driveline and provide enough torque to robustly start the engine.

For example, during a controller initiated engine start when the engine is warm, it may be desirable to provide spark at timing well in advance of MBT spark timing (e.g., minimum spark advance for best engine torque) so that less engine torque is provided by the engine as compared to when spark is provided to the engine at MBT spark timing. In this way, engine torque can be limited to control the amount of torque delivered to the vehicle driveline even when engine cylinders are full of air after an engine stop. On the other hand, it may be desirable to provide spark to the engine at a second timing when the engine is warm in response to an operator requested start when a transmission is in park.

In one example, spark provided to the engine may be retarded when an operator requests an engine start as compared to when a controller initiates an engine start. The spark timing during the operator initiated engine start may provide additional engine torque so that the engine accelerates at a higher rate and provides a stronger indication to the driver that the engine is started. In still other examples, higher torque may be provided during an operator initiated engine cold start to overcome engine friction at lower engine temperatures. Thus, it may be desirable to provide different spark timings to an engine depending on whether or not the engine start is requested by an operator.

The present description may provide several advantages. In particular, the approach may improve engine starting consistency. Further, the approach may provide improved engine emissions when a controller initiates an engine restart. For example, the engine may be restarted such that lower pressure combustion occurs during a controller initiated engine restart since lower pressure spark timing is adjusted away from MBT spark timing. Consequently, less NOx may be formed in engine cylinders during a controller initiated engine restart. Further, the approach may improve a driver's perception of vehicle starting when the engine is started automatically by reducing driveline torque disturbances.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving starting of an engine that may be started via operator or controller initiated starting requests. In one non-limiting example, the engine may be configured as illustrated in FIG. 1.

Figure 2:
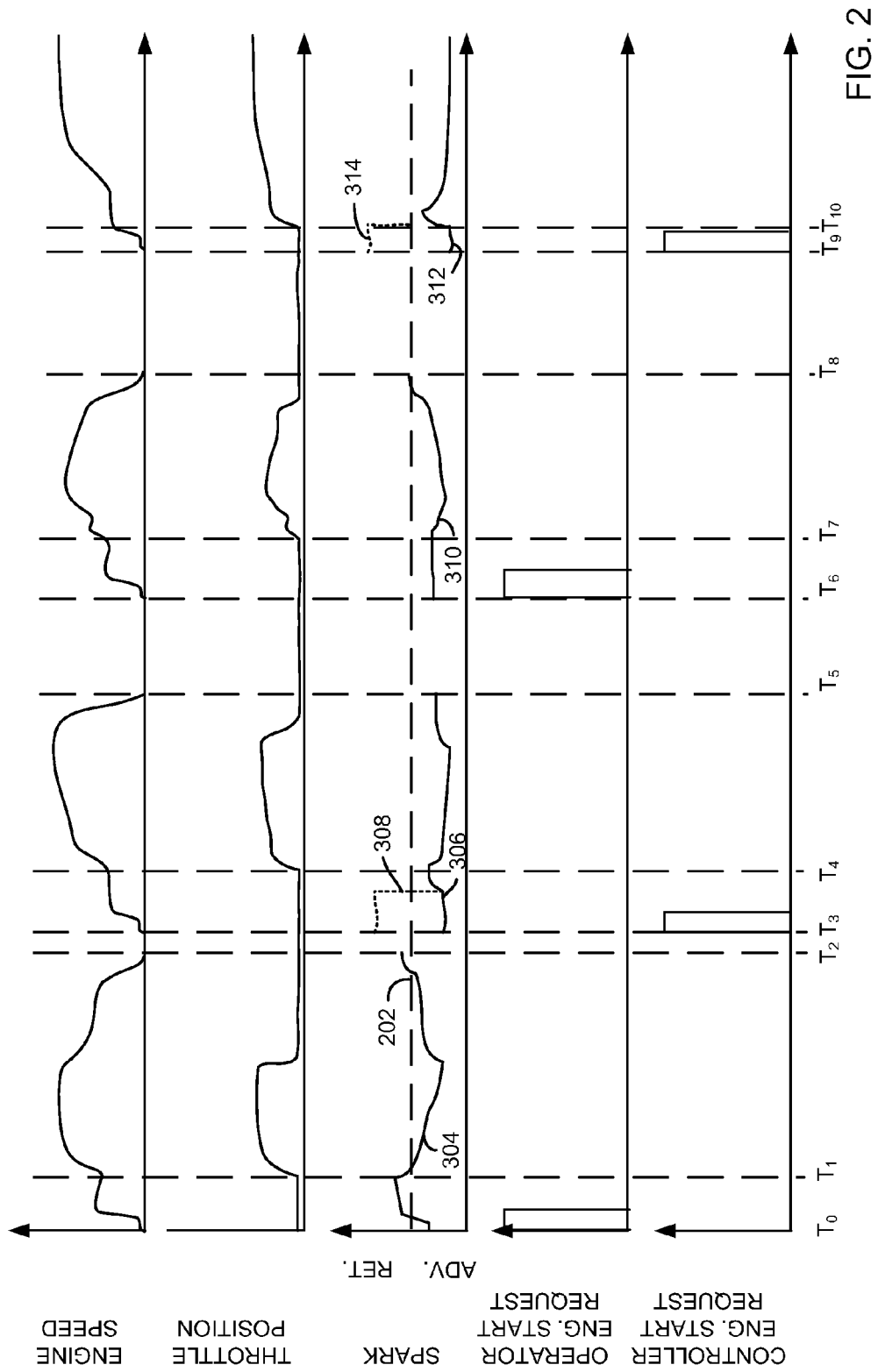
FIGS. 2 and 3 are prophetic plots of signals of interest during an engine starting sequence.
Figure 3:
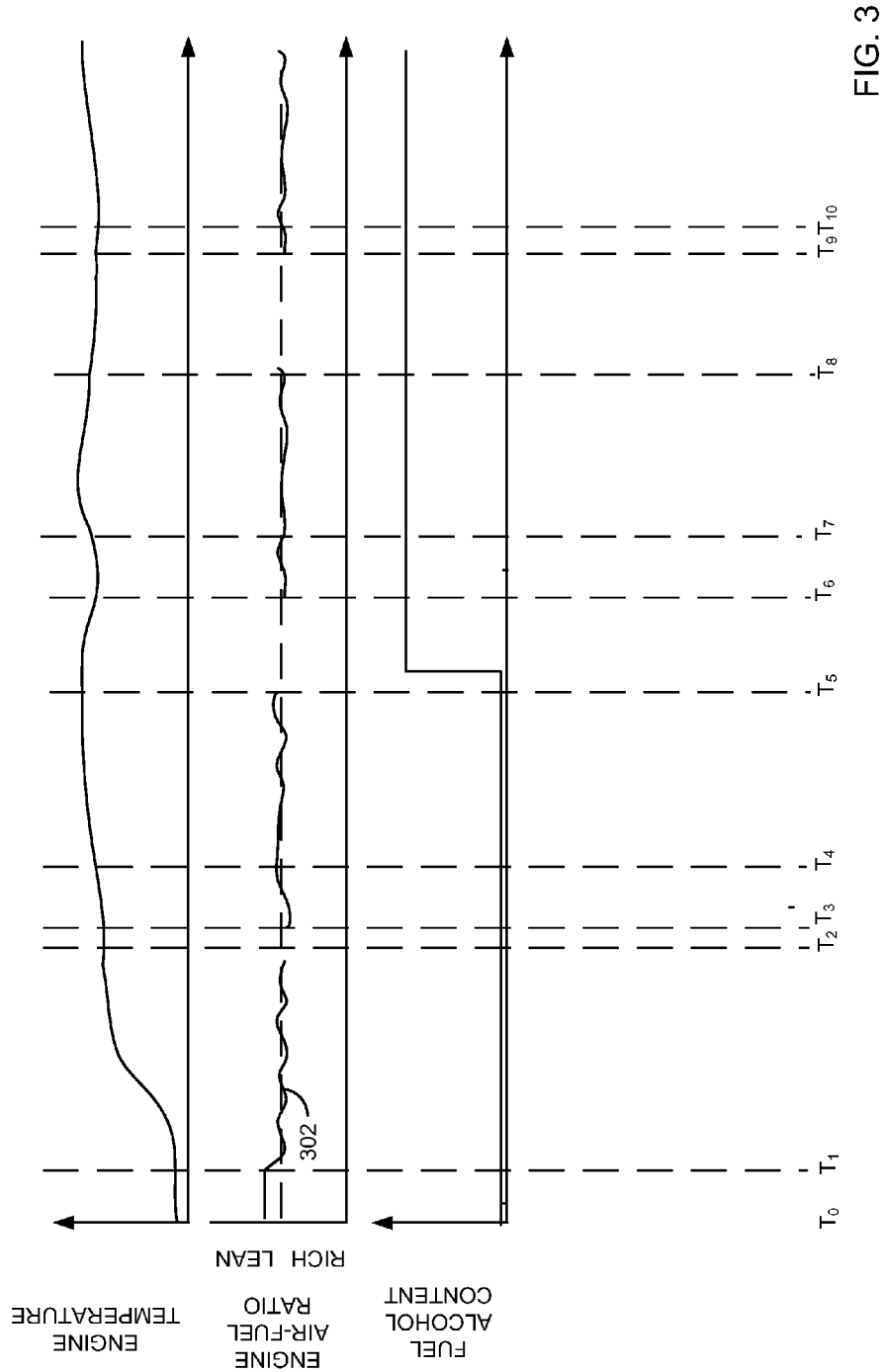

Engine spark may be controlled as shown in the sequence illustrated in FIGS. 2 and 3. In particular, spark may be controlled differently between operator and controller initiated engine starts and stops. In one example during a controller requested engine start, spark timing of a cylinder can be adjusted to timing after top-dead-center compression stroke for a first combustion event in a cylinder since engine stop. In another example during a controller requested engine start, spark timing of the cylinder can be adjusted to timing before top-dead-center compression stroke and before a spark timing of an operator requested engine start. In this way, engine torque may be limited during a controller initiated engine start so that less engine torque may be transferred to the vehicle driveline during an engine start. The method of FIG. 4 describes one method for stopping an engine of a vehicle that may be automatically stopped (e.g., in response to selected idle-stop conditions being met and without an operator request to stop the engine) as illustrated in FIGS. 2-3. The method of FIG. 5 describes a method for restarting an engine that has been stopped by an operator input or via a controller.

Figure 1:
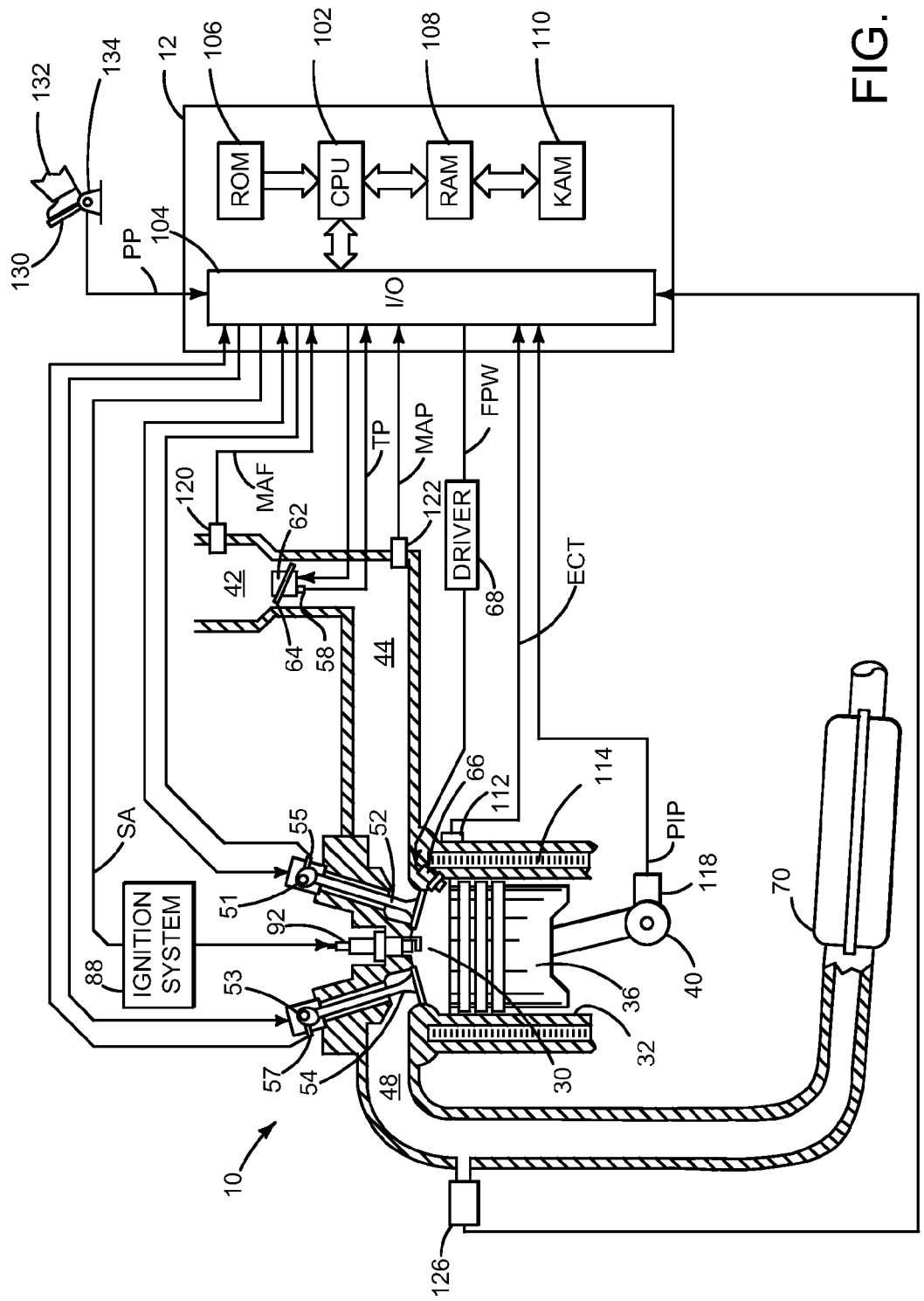
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly or other known variable valve actuator. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom-dead-center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top-dead-center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIGS. 2 and 3, signals of interest during selected engine starting and stopping conditions are shown. FIG. 2 includes five plots of interest during a variety of engine starts and stops, while FIG. 3 includes three plots. The engine is operating in a four cycle mode with intake and exhaust valves opening and closing according to the four cycle mode. The signals of FIGS. 2 and 3 may be provided via the methods of FIGS. 4 and 5 executed via instructions of controller 12 of FIG. 1. Each of vertical markers $T_0$-$T_{10}$ represents selected times of interest within the sequence illustrated in FIGS. 2 and 3. The plots of FIGS. 2 and 3 occur at the same time and within the same engine system. Thus, time $T_1$ of FIG. 2 and time $T_1$ of FIG. 3 occur at the same time.

It should also be mentioned that throughout the description a time since engine stop may be expressed as an amount of time the engine has been rotating since the engine was last stopped.

The first plot from the top of FIG. 2 shows engine speed during the operating sequence. Engine speed increases in the direction of the Y axis arrow and is zero at the X axis. The X axis represents time, and time increases from the left to the right side of the plot.

The second plot from the top of FIG. 2 shows engine air intake throttle position during the operating sequence. The throttle opening amount increases in the direction of the Y axis arrow. Thus, more air can pass through the throttle when the throttle opening is larger. The throttle opening is substantially closed when the throttle trace is at the X axis. The X axis represents time, and time increases from the left to the right side of the plot.

The third plot from the top of FIG. 2 shows engine spark advance during the operating sequence. Horizontal line 202 represents top-dead-center compression stroke of the cylinder receiving spark. Spark timings above horizontal line 202 represents spark timings that are retarded from top-dead-center compression stroke of the cylinder receiving spark. Spark timings below horizontal line 202 represent spark timings that are advanced from top-dead-center compression stroke. MBT spark timing can vary with engine operating conditions (e.g., engine speed, engine torque). The X axis represents time, and time increases from the left to the right side of the plot.

The fourth plot from the top of FIG. 2 shows an operator initiated engine start request. The operator initiated engine start request may be via a key or a pushbutton, for example. Actions by the operator such as pressing an accelerator pedal or releasing a brake are not to be construed as operator initiated engine start requests. Rather, such conditions may be input conditions for a controller or automatic engine start request. An operator engine start request is present when the signal is at a high level. The X axis represents time, and time increases from the left to the right side of the plot.

The fifth plot from the top of FIG. 2 shows a controller initiated engine start request. The controller initiated engine start request may be present after the engine has been automatically stopped and when selected conditions have been met, excepting an operator engine start request. A controller engine start request is present when the signal is at a high level. The X axis represents time, and time increases from the left to the right side of the plot.

Referring now to the first plot of FIG. 3, a plot of engine temperature is shown. Engine temperature increases in the direction of the Y axis arrow. The engine temperature may be a coolant temperature, cylinder head temperature, or some other temperature of the engine. The X axis represents time, and time increases from the left to the right side of the plot.

The second plot of FIG. 3 represents a trace of an engine air-fuel ratio. Horizontal line 302 represents a stoichiometric air-fuel mixture. The engine is supplied a lean mixture when the air-fuel trace is above horizontal line 302. The engine is supplied a rich mixture when the air-fuel trace is below horizontal line 302. The X axis represents time, and time increases from the left to the right side of the plot.

The third plot of FIG. 3 represents an alcohol fuel content of fuel supplied to the engine for combustion. Alcohol content of fuel supplied to the engine increases in a direction of the Y axis arrow. Gasoline content of the fuel increases toward the X axis. The X axis represents time, and time increases from the left to the right side of the plot.

At time $T_0$, the engine begins to rotate in response to an operator request to start the engine. The throttle position is shown substantially closed; however, the throttle is positioned to allow air flow so that the engine can idle. It should be mentioned that the engine cylinders may fill with air during an engine stop since air may leak past valves while the engine is stopped. As such, pressure in engine cylinders at the time of start may be atmospheric pressure. Further, the amount of air held in engine cylinders during an engine stop may vary depending on the position of the engine. For example, if a cylinder is stopped in the middle of a compression stroke of the cylinder, the cylinder may hold an amount of air related to half the cylinder volume at atmospheric pressure.

The engine spark advance (e.g., the spark timing of engine cylinders) at time $T_0$, in particular spark timing for a first combustion event since engine stop, is shown advanced of top-dead-center compression stroke so that spark is delivered to each engine cylinder individually, during a cycle of the cylinder receiving the spark, as the cylinder approaches top-dead-center compression stroke. Thus, combustion is initiated via a spark in the cylinder where the spark is delivered before top-dead-center compression stroke. The controller initiated engine start request remains low indicating that the engine is being started via the operator. Engine temperature is also low at time $T_0$ indicting that the engine is being cold started. The engine air-fuel ratio is lean so as to reduce the amount of hydrocarbons in engine exhaust emissions during the cold engine start.

Further, the alcohol content in fuel injected to the engine is low during the cold engine start.

At time $T_1$, engine speed has achieved idle speed and the throttle position is increasing indicative of an increasing engine torque request of the engine. Engine spark is shown retarded of top-dead-center compression stroke to reduce exhaust gas hydrocarbons and to increase exhaust heating. Spark timing advances through top-dead-center compression stroke in response to an increasing engine torque request. The operator engine start request and the controller engine start request are low after engine start. Engine temperature starts to slowly increase as combustion in engine cylinders heat the engine. The engine air-fuel ratio is adjusted to oscillate around a stoichiometric air-fuel ratio. The alcohol content or concentration of alcohol in the fuel injected to the engine remains at a low level at time $T_1$.

Between time $T_1$ and $T_2$, engine speed and throttle position increase and decrease in response to an operator provided engine torque request as indicated by a changing throttle position. Shortly after $T_1$, engine speed increases as the throttle is opened further. Spark is initially advanced following curve 304, and the spark is retarded toward top-dead-center compression stroke timing as the throttle closes and the engine torque demand decreases. The spark is retarded so that a torque reserve is maintained by the engine. The torque reserve may be tapped by advancing spark in response to an unexpected torque demand. For example, spark may be advanced by 5 degrees in response to an increase in alternator load. In this way, engine torque can be quickly increased without having to wait for additional air to enter the engine via the intake manifold.

As engine speed decreases, the vehicle reaches operating conditions where the engine may be automatically deactivated. In one example, the engine may be automatically deactivated without an operator requesting an engine stop when the engine torque demand is less than a threshold level, engine temperature is greater than a threshold level, and engine speed is less than a threshold level. The operator and controller engine start requests remain low between times $T_1$ and $T_2$ since the engine is operating. In addition, the engine air-fuel ratio oscillates around stiochiometric conditions and the alcohol content of fuel supplied to the engine remains at a low level. In an example where the engine is coupled to an automatic transmission, the automatic transmission may remain in drive or a gear while the engine is stopped automatically via a controller. Transmission clutches may be applied or released while the engine is stopped by controlling oil pressure supplied from an electric transmission oil pump. In other examples, the transmission may be adjusted to a neutral state and vehicle brakes may be applied when the engine is stopped.

At time $T_2$, the engine is stopped in response to an automatic engine stop. The engine may be stopped via a controller when selected engine operating conditions occur as described above. Stopping the engine automatically can conserve fuel since fuel is not required to keep the engine idling. The engine may remain stopped until conditions change such that it is desirable to restart the engine. For example, the engine may be restarted after the operator releases a vehicle brake pedal. In one example, spark may be retarded from base spark timing during a controller initiated engine stop so as to increase a temperature of a catalyst positioned in an exhaust system downstream of the engine.

By increasing the catalyst temperature in response to the controller initiated engine stop, the engine may stay off for a longer period of time so that the engine may not have to be restarted as soon due to a drop in catalyst temperature. In the sequence illustrated in FIGS. 2 and 3 the engine remains stopped from time $T_2$ to time $T_3$.

At time $T_3$, the engine is restarted automatically via a controller engaging a starter and supplying spark and fuel to the engine. The controller engine start request goes from a low state to a high state indicating to restart the engine. The engine restart may be initiated by the controller in response to a change in operating conditions such as engine temperature or catalyst temperature decreasing, release of a brake pedal, or an operator torque request. An engine starter is engaged when the controller engine start request signal goes high. Further, fuel injection and spark are delivered to commence combustion within engine cylinders. Spark for a first combustion event in each cylinder is advanced to timing in advance of top-dead-center compression stroke of the respective cylinders as shown via curve 306. It can be seen from FIG. 2 that the spark timing during a controller initiated automatic start is in advance of spark timing during an operator initiated engine start. The spark advance during the controller initiated automatic engine start is advanced so that engine torque may be decreased so as to limit engine speed. Thus, during a controller initiated start, spark may be advanced more than during an operator initiated start during substantially the same engine operating conditions. In one example, the engine spark is advanced to timing that corresponds to an indicated mean effective pressure (IMEP) within the cylinder of less than 4 bar. Thus, the spark is advanced (e.g., advanced beyond MBT timing) to reduce cylinder torque so that engine speed can be controlled during engine run-up (e.g., acceleration from cranking speed to engine idle speed). In this way, engine speed can be controlled such that there may be less possibility of exceeding the desired engine idle speed, or at least exceeding the desired engine idle speed by only a threshold amount. Engine speed after time $T_3$ is shown increasing from crank speed and rolling up to idle speed with little overshoot. In some examples, the location of peak cylinder pressure (LPP) may be adjusted via advancing spark timing so that LPP is before TDC compression stroke for the first cylinder to combust an air-fuel mixture since engine stop.

In an alternative example, spark timing for at least the first combustion event of one or more engine cylinders (e.g., the first cylinder to combust an air-fuel mixture since engine stop) during an engine start may be retarded from top-dead-center compression stroke to a timing where IMEP in the cylinder is less than 4 bar for a first combustion event of the cylinder as shown via curve 308. Thus, in this example, a first combustion event in the engine since engine stop may be initiated via a spark placed after top-dead-center compression stroke of the cylinder receiving the spark. In this way, similar to advancing spark beyond MBT spark timing, spark may be retarded during a first combustion event of a cylinder, and during subsequent combustion events if desired, such that the cylinder provides less than 4 bar IMEP. As such, during a controller initiated start, spark may be retarded more than during an operator initiated start during substantially the same engine operating conditions.

The engine is shown starting with a slightly rich air-fuel mixture so that at least some air that may have entered the catalyst positioned downstream of the engine in the exhaust system during the engine stop period may be used to oxidize hydrocarbons in the rich exhaust mixture. In this way, the catalyst chemistry may be brought back into balance so that unexpected lean exhaust gas mixtures may be processed efficiently by the catalyst. In addition, the engine temperature remains relatively warm and the alcohol content in fuel supplied to the engine remains low.

At time $T_4$, the throttle opening increases so as to provide additional air for increasing engine torque. The spark timing is retarded toward top-dead-center as the engine speed stabilizes near a desired engine idle speed. However, spark timing is advanced at time $T_4$ in response to changing engine speed and engine torque. Between time $T_4$ and time $T_5$, engine speed increases and then decreases as the position of the throttle is varied in response to an operator torque demand.

At time $T_5$, the engine is stopped in response to an operator requested engine stop. The operator may request an engine stop via a key off. During the operator requested engine stop the spark may be ceased at a spark advance timing that was present immediately prior to the operator requested engine stop. Thus, in one example, for an operator requested engine stop, the spark timing may not be adjusted in response to an operator requested engine stop.

Between time $T_5$ and time $T_6$, the alcohol content of fuel provided to the engine increases. In one example, the alcohol content of fuel supplied to the engine increases to a level of 85% of the fuel concentration.

At time $T_6$, the operator engine start request goes to a high level in response to an operator requested engine start. In one example, the operator engine start request signal goes to a high level in response to a key-on by an operator. The engine is cranked and spark and fuel are provided to the engine in response to the high level operator engine start request. The spark timing during an operator requested engine start is retarded as compared to spark timing for a controller initiated engine start. For example, the spark timing may be retarded closer to MBT spark timing. Thus, the engine may accelerate at a higher rate and to a higher speed during an operator requested engine start as compared to a controller requested engine start. The spark timing at $T_6$ is advanced further than the spark timing at time $T_0$ in response to engine temperature and the alcohol content in fuel delivered to the engine. In particular, as the alcohol content of the fuel increases the spark timing is advanced further from MBT spark timing for the first combustion event in engine cylinders since engine stop.

Engine speed is shown accelerating the engine above idle speed and then decaying back to idle speed as time goes on. The engine air-fuel ratio is also shown at stiochimetric conditions. The amount of fuel injected to the engine may be increased so as to achieve stoichiometric combustion in the presence of higher alcohol content fuel.

At time $T_7$, the throttle opening amount is increased in response to an increasing engine torque demand from the operator. The engine speed increases as the engine torque amount increases. The engine temperature remains warm and the engine air-fuel ratio is substantially stoichiometric during the warm operator requested engine start and during subsequent engine operation.

At time $T_8$, the engine is stopped in response to a controller requested engine stop. Similar to engine operation at time $T_2$, spark timing may be retarded to a timing later than top-dead-center compression stroke to heat a catalyst within the engine exhaust system. The engine remains stopped until time $T_9$ where the engine is restarted. The engine temperature falls by a small amount between times $T_8$ and $T_9$. However, the engine remains warm until the engine restart.

At time $T_9$, the engine is restarted automatically via a controller requested engine start. The controller engine start request signal transitions from a low level to a high level at time $T_9$ to initiate automatic engine starting. The spark timing is shown as set at curve 312 to a more advanced timing than the spark timing at $T_0$, $T_3$, and $T_6$. In this way, the spark timing for a controller requested engine start is adjusted (e.g., advanced) to control engine speed and in response to the alcohol content (e.g., further advanced) of fuel supplied to the engine.

In an alternative example, the spark timing for the controller requested engine start for the first combustion event occurring since engine stop may be adjusted to a timing retarded from top-dead-center compression stroke as shown by curve 314. Engine speed may be controlled by retarding the spark timing until after top-dead-center compression stroke of the at least the first cylinder to combust an air-fuel mixture after an engine stop. In particular, engine speed may be controlled so that it does not increase above the desired idle speed by more than a predetermined amount. The retarded spark timing of curve 314 includes retard for IMEP control and increasing alcohol content in the fuel. Thus, curve 314 is retarded further than the spark timings at $T_0$, $T_3$, and $T_6$.

At time $T_{10}$, the spark timing is shown being retarded from the spark timing for the first combustion event since engine stop (e.g., the initial spark timing of curve 314) or advanced from the first combustion event since engine stop (e.g., the initial spark timing of curve 314). Thus, an engine torque command or a change in operating conditions of the engine may cause a transition in spark timing to a spark timing closer to MBT spark timing. The spark timing may be adjusted in response to a torque request or throttle input that occurs within a specified time of engine starting. In the example at time $T_4$, the throttle opening timing was delayed to allow the spark timing to transition to spark timing closer to MBT spark timing. The engine speed and engine throttle are shown increasing after time $T_{10}$ in response to an operator torque request.

In this way, spark timing between operator and controller requested engine starts may be adjusted so as to reduce the possibility of transferring engine torque to the vehicle driveline even when the transmission is engaged in a gear. Further, spark timing can be adjusted differently between operator requested engine stops and controller requested engine stops.

Figure 4:
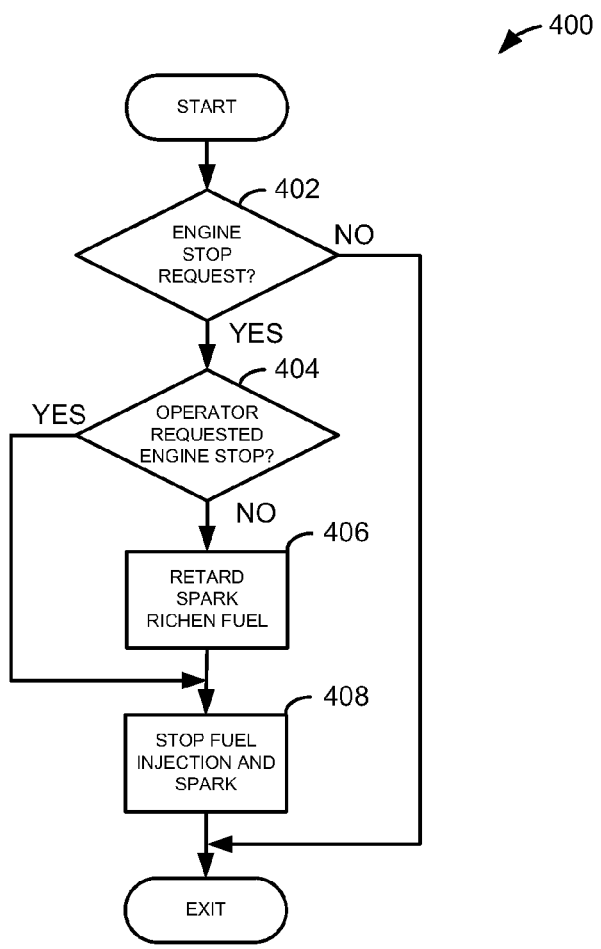
FIG. 4 is an example flowchart for stopping an engine.

Referring now to FIG. 4, a flowchart for adjusting spark timing during an engine stop is shown. The method of FIG. 4 is executable via instructions by controller 12 as depicted in FIG. 1.

At 402, method 400 judges whether or not an engine stop request is present. If so, method 400 proceeds to 404. Otherwise, method 400 proceeds to exit.

At 404, method 400 judges whether or not the engine stop request is an operator requested engine stop request. An operator may request an engine stop via a push button or turning a vehicle key to an off position. If the engine stop request is an operator requested engine stop, method 400 proceeds to 408. Otherwise, method 400 determines that the engine stop request is a controller initiated engine stop request and method 400 proceeds to 406. A controller engine stop request may be provided when selected operating conditions are met. For example, when engine speed is less than a threshold speed and when an engine torque demand is less than a threshold amount.

At 406, method 400 proceeds to retard spark timing for at least one cylinder after the controller initiated engine stop request. In one example, the spark timing is retarded to a timing of retarded from top-dead-center of compression stroke in the cylinder receiving the spark. Thus, combustion in the cylinder can be delayed so that more energy from combusting an air-fuel mixture may be directed to the exhaust system to heat a catalyst in the exhaust system. In this way, the catalyst temperature may be increased prior to engine stop so that the engine may not be started as soon in response to a low catalyst temperature. In some examples, spark may be retarded for a predetermined number of combustion events since an automatic controller initiated engine stop.

In some examples, the engine air-fuel mixture may also be richened in response to a controller initiated engine stop. By richening the engine air-fuel mixture prior to engine stop, oxygen that enters the catalyst during the engine stop period may be consumed to oxidize hydrocarbons so that the engine chemistry is more balanced when the engine is restarted. In this way, engine emissions may be reduced during engine starting.

At 408, method 400 stops fuel injection and spark delivered to engine cylinders so that the engine stops. Method 400 proceeds to exit after stopping spark and fuel flow to the engine.

Figure 5:
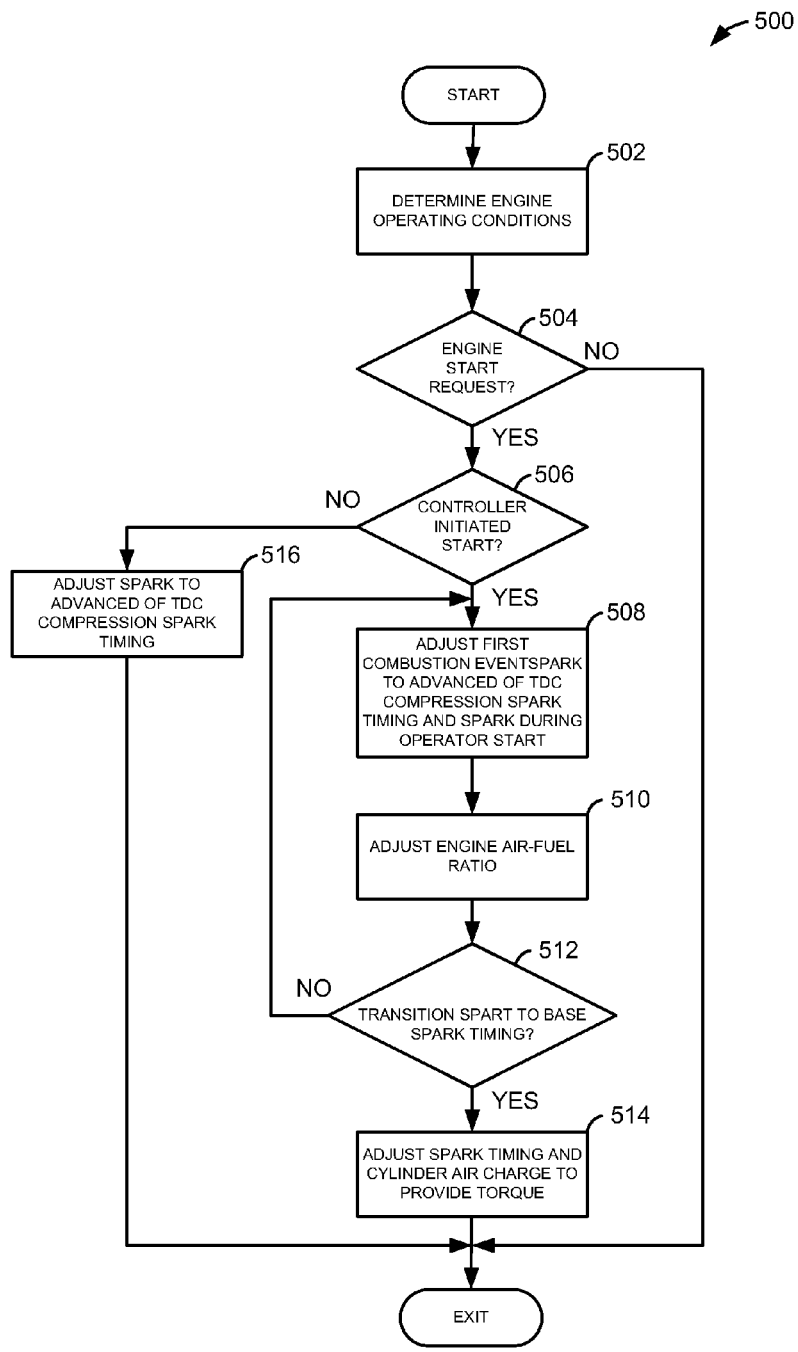
FIG. 5 is an example flowchart for starting an engine in response to operator and controller initiated engine starts.

Referring now to FIG. 5, a flowchart of a method for adjusting spark is shown. The method of FIG. 5 is executable via instructions by controller 12 as depicted in FIG. 1.

At 502, method 500 determines engine operating conditions. Engine operating conditions may include but are not limited to engine temperature, engine speed, engine torque, controller and operator engine start and stop requests, and engine position. Method 500 proceeds to 504 after engine operating conditions are determined.

At 504, method 500 judges whether or not there is an engine start request. If method 500 judges that there is an engine start request, method 500 proceeds to 506. Otherwise, method 500 proceeds to exit.

At 506, method 500 judges whether or not there is a controller engine start request. A controller engine start request may be initiated via a controller in response to selected operating conditions. For example, a controller engine start request may be initiated in response to when an engine has been automatically stopped via the controller and when a brake pedal has been released. If method 500 judges that a controller initiated engine start request is present, method 500 proceeds to 508. Otherwise, controller 500 may judge that the engine start request is an operator requested engine start and method 500 proceeds to 516. An operator engine start request may be provided via an operator specifically requesting an engine start via a key-on or pushbutton input. Lifting of a brake pedal, depressing an accelerator pedal or other similar actions are not construed as an operator engine start request.

At 516, method 500 adjusts spark timing to in advance of top-dead-center compression stroke of the cylinder receiving the spark. For example, a spark may be provided to a cylinder ten crankshaft degrees before top-dead-center compression stroke of the cylinder receiving the spark. Thus, spark may be initiated in the cylinder before a piston in the cylinder fully compresses the air-fuel mixture. The spark initiates combustion in the cylinder so as to accelerate the engine.

At 508, spark timing a first combustion event in a cylinder since engine stop is adjusted. For example, if cylinder number one of a four cylinder engine is a first cylinder to combust an air-fuel mixture since engine start, spark timing for cylinder number one is adjusted for the first combustion event in cylinder number one since engine stop. In other examples, spark timing for a first combustion event in each cylinder of an engine since engine stop is adjusted. For example, spark timing for cylinders one through four of a four cylinder engine are adjusted in response to a request to start the engine.

Spark timing for a controller start is adjusted in advance of spark timing for an operator requested engine start during similar engine operating conditions (e.g., similar engine temperature and ambient air temperature) as shown in FIGS. 2-3. For example, if an engine is started via an operator request at a warm engine temperature, spark timing may be adjusted to a timing of ten crankshaft degrees before top-dead-center compression stroke of the cylinder receiving the spark. On the other hand, spark timing of a controller requested engine start may be set to fifteen crankshaft degrees before top-dead-center compression stroke so that engine speed may not rise as high during the controller requested engine start. By advancing spark further than spark timing during an operator requested engine start, it may be possible to limit torque transmitted from the engine to the driveline. Consequently, restarting the engine while a transmission of the vehicle is in gear may be less noticeable to an operator. Further, spark timing may be adjusted in response to the concentration of alcohol in fuel injected to the engine. For example, spark timing may be further advanced in response to an increasing amount of alcohol in fuel injected to the engine when spark timing is in advance of TDC compression stroke of a cylinder. On the other hand, spark timing may be further retarded in response to an increasing amount of alcohol in fuel injected to the engine when spark timing is retarded from TDC compression stroke of the cylinder.

In an alternate example, spark timing for a first combustion event in a cylinder since engine stop may be retarded from top-dead-center compression stroke of the cylinder to limit engine torque during a controller requested engine start. In yet another example, spark timing for a first combustion event in each cylinder of an engine since engine stop may be retarded to limit engine torque during a controller requested engine start. Method 500 proceeds to 512 after spark timing is adjusted.

At 510, method 500 adjusts the engine air-fuel ratio for the engine start. The engine air-fuel ratio may be adjusted differently for a controller requested engine start as compared to an operator requested engine start. For example, since the transmission may be in gear during a controller requested engine start, the engine air-fuel ratio may be adjusted richer than an operator requested engine start so as to reduce NOx production during engine starting. Method 500 proceeds to 512 after the engine air-fuel ratio is adjusted.

At 512, method 500 judges whether or not to transition spark timing to base spark timing (e.g., spark timing based on engine speed and load). In one example, spark timing may be transitioned from timing advanced of base spark timing to base spark timing in response to a number of combustion events since engine stop. In another example, spark timing may be transitioned from timing advanced of base spark timing to base spark timing in response to a time since engine start. In still another example, spark timing may be transitioned from timing advanced of base spark timing to base spark timing in response to an operator torque request. If method 500 judges to transition to base spark timing, method 500 proceeds to 514. Otherwise, method 500 returns to 508.

At 508, method 500 adjusts spark timing and cylinder air charge to provide a desire level of torque at base spark timing. If spark timing is advanced of base spark timing, the engine air amount may be increased and spark timing may be retarded to control engine torque. If spark timing is retarded of base spark timing, the engine air amount may be increased and the spark timing may be advanced to control engine torque. Method 500 exits after spark is transitioned to base spark timing.

Thus, the methods of FIGS. 4 and 5 provide for a method for starting an engine, comprising: cranking the engine via a starter; and adjusting a spark timing for a cylinder of the engine to a timing retarded of top-dead-center compression stroke of the cylinder in response to a request to automatically start the engine, the spark timing for a first combustion event in the cylinder since a stop of the engine. In this way, engine torque transmitted through a torque converter during an engine start may be reduced. The method further comprises transitioning from spark timing retarded of top-dead-center compression stroke to spark timing at or advanced of MBT spark timing in response to an engine operating condition. The method includes where the engine operating condition is at least one of an operator torque request, an engine speed, an intake manifold pressure, a number of combustion events since engine stop, a temperature, and a time since engine stop. The method also includes where transitioning from spark timing retarded of top-dead-center compression stroke to spark timing at or advanced of MBT spark timing includes transitioning from spark timing retarded of top-dead-center compression stroke and a first engine torque to spark timing at or advanced of MBT spark timing and a second engine torque. The method includes where the first engine torque and the second engine torque are substantially the same engine torque. In one example, the method includes where the second engine torque is greater than the first engine torque. The method also includes where the second engine torque is based on an operator torque request. The method further includes where adjusting spark timing of the cylinder includes further retarding spark timing away from MBT spark timing for a first combustion event since the stop of the engine as an amount of alcohol in a fuel injected to the engine increases.

The methods of FIGS. 4-5 also provide for a method for starting an engine, comprising: cranking the engine via a starter; in response to a controller requested engine start, adjusting spark timing of the engine to a first timing; and in response to an operator requested engine start, adjusting spark timing of the engine to a second timing, the second timing different than the first timing. Thus, in at least one example, the method includes controlling spark differently between controller and operator engine starts. The method also includes where the first timing is provided during a cylinder cycle of a cylinder of the engine, a first combustion event of the cylinder since engine stop occurring during the cylinder cycle, the first timing advanced of the second timing. The method also includes where the first timing is provided during a cylinder cycle of a cylinder of the engine, a first combustion event of the cylinder since engine stop occurring during the cylinder cycle, the first timing after top-dead-center compression stroke. The method further comprises transitioning the cylinder from spark timing retarded of top-dead-center compression stroke to spark timing at or advanced of MBT spark timing in response to an engine operating condition, the transitioning taking place between a first combustion event and a second combustion. The method also includes where transitioning to spark timing advanced of MBT spark timing includes retarding spark timing toward MBT spark timing in response to an increasing torque request during transitioning to spark timing advanced of MBT spark timing. In another example, the method includes where the engine operating condition is a number of combustion events since engine stop or a time since engine stop. The method further includes where fuel is injected at a first timing in response to the controller request to start the engine and at a second timing in response to the operator requested engine start, and where the first timing is different from the second timing.

In another example, the methods of FIGS. 4 and 5 provide for starting an engine, comprising: stopping the engine after retarding spark timing in response to a request to automatically stop the engine; cranking the engine via a starter; in response to a controller requested engine start, adjusting spark timing of the engine to a first timing; and in response to an operator requested engine start, adjusting spark timing of the engine to a second timing, the second timing different than the first timing. The method further comprises adjusting fuel injection timing in response to the controller requested engine start, the fuel injection timing adjusted to provide a rich air-fuel mixture to cylinders of the engine. The method also includes where the fuel injection timing is further adjusted in response to an alcohol concentration of a fuel injected to the engine. In one example, the method includes where the first timing is further adjusted in response to engine operating conditions. The method further includes where the first timing includes providing spark to a cylinder of the engine during a power stroke of the cylinder, and the method further comprising transitioning from providing spark to the cylinder during the power stroke of the cylinder to a timing advanced of MBT spark timing in response to an engine operating condition.

Figure 6:
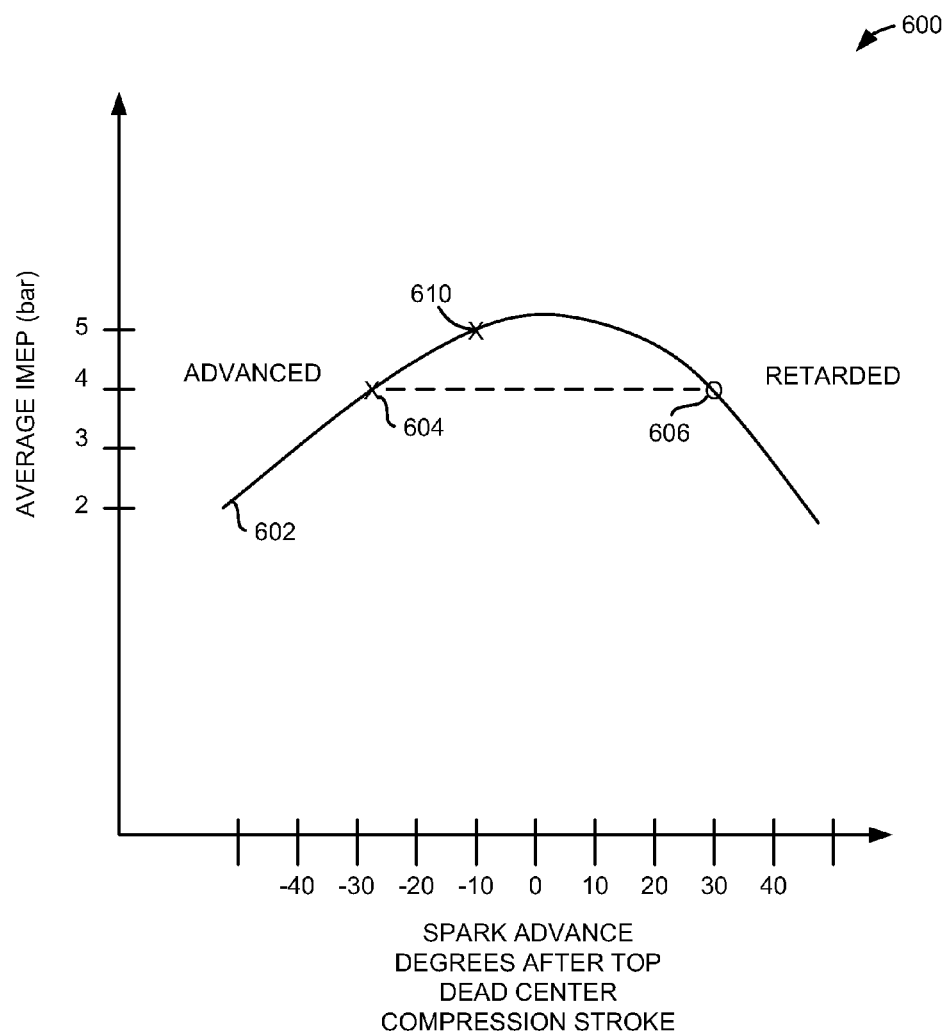
FIG. 6 is an example prophetic plot of engine IMEP and spark timing.

Referring now to FIG. 6, a plot of engine IMEP and spark timing is shown. The Y axis represents IMEP and the X axis represents spark advance. A spark advance of zero is indicative of spark timing at top-dead-center compression stroke. A negative spark value is indicative of spark timing advanced from top-dead-center compression stroke. A positive spark value is indicative of spark timing retarded from top-dead-center compression stroke. Thus, it can be observed from FIG. 6 that curve 602 includes two spark timings where 4 bar IMEP may be provided via engine cylinders. Namely, at 604 and 606 two different spark timings may provide the same IMEP. At 604, the spark timing is approximately −28 degrees advanced from top-dead-center compression stroke. At 606, the spark timing is approximately 30 degrees retarded from top-dead-center compression stroke. Thus, IMEP values of less than 4 bar can be provided in advance or retarded from top-dead-center compression stroke. The spark timing at 610 is one example of spark timing during an operator requested engine start. Thus, the spark timings of 604 and 606 provide lower IMEP as compared to the spark timing at 610 so that engine acceleration during a controller requested engine start may be limited. Note that the spark timing at 604 is advanced of the spark timing at 610 and that the spark timing at 606 is retarded of the spark timing at 610 and top-dead-center compression stroke.

As will be appreciated by one of ordinary skill in the art, routines described in FIGS. 4-5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I15, V6, V8, V10, and V12 engines operating in natural gas, gasoline, diesel, or alternative fuel configurations could use the present description to advantage.

The invention claimed is:

1. A method, comprising:
   automatically stopping an engine; and
   starting the stopped engine, including adjusting a spark timing for a cylinder of the engine to a timing retarded from top-dead-center compression stroke of the cylinder in response to a request to automatically start the engine, the spark timing for a first combustion event in the cylinder since the stop of the engine and while the engine is being cranked via a starter.

2. The method of claim 1, further comprising transitioning the spark timing retarded from top-dead-center compression stroke to a timing in advance of MBT spark timing in response to an engine operating condition.

3. The method of claim 2, where the engine operating condition is at least one of an operator torque request, an engine speed, an intake manifold pressure, a number of combustion events since engine stop, a temperature, and a time since engine stop.

4. The method of claim 2, where the engine provides a first engine torque at the spark timing retarded from top-dead-center compression stroke, and where the engine provides a second engine torque at the spark timing in advance of MBT spark timing.

5. The method of claim 4, where the first engine torque and the second engine torque are substantially a same engine torque.

6. The method of claim 4, where the second engine torque is greater than the first engine torque.

7. The method of claim 6, where the second engine torque is based on an operator torque request.

8. The method of claim 1, where adjusting the spark timing for the cylinder includes further retarding the spark timing away from MBT spark timing for the first combustion event since the stop of the engine as an amount of alcohol in a fuel injected to the engine increases.

9. A method for starting an engine, comprising:
   automatically stopping the engine in response to idle-stop conditions;

in response to a controller requested engine start from stop during a first condition, adjusting a spark timing to a first timing during engine cranking via a starter; and in response to an operator requested engine start during a second condition substantially the same as the first condition, adjusting the spark timing to a second timing during engine cranking via the starter, the second timing different than the first timing.

10. The method of claim 9, where the first timing is provided during a cylinder cycle of a cylinder of the engine, a first combustion event of the cylinder since engine stop occurring during the cylinder cycle, the first timing advanced of the second timing.

11. The method of claim 9, where the first timing is provided during a cylinder cycle of a cylinder of the engine, a first combustion event of the cylinder since engine stop occurring during the cylinder cycle, the first timing after top-dead-center compression stroke.

12. The method of claim 11, further comprising transitioning the spark timing from the first timing after top-dead-center compression stroke to a timing at or advanced of MBT spark timing in response to a third condition, the transitioning taking place between the first combustion event and a second combustion event.

13. The method of claim 12, where the transitioning to the spark timing advanced of MBT spark timing includes retarding the spark timing toward MBT spark timing in response to an increasing torque request during the transitioning to the spark timing advanced of MBT spark timing.

14. The method of claim 12, where the third condition is a number of combustion events since engine stop or a time since engine stop.

15. The method of claim 9, where fuel is injected at the first timing in response to the controller requested engine start and at the second timing in response to the operator requested engine start, and where the first timing is different from the second timing.

16. A method for starting an engine, comprising:

stopping the engine after retarding spark timing in response to a request to automatically stop the engine;

in response to a controller requested engine start during a first condition with an absence of an operator engine start request, adjusting the spark timing of the engine to a first timing during cranking of the engine via a starter; and in response to an operator requested engine start during a second condition, the second condition substantially the same as the first condition, adjusting the spark timing of the engine to a second timing during cranking of the engine via the starter, the second timing different than the first timing.

17. The method of claim 16, further comprising adjusting a fuel injection timing in response to the controller requested engine start, the fuel injection timing adjusted to provide a rich air-fuel mixture to cylinders of the engine.

18. The method of claim 17, where the fuel injection timing is further adjusted in response to an alcohol concentration of a fuel injected to the engine.

19. The method of claim 16, where the first timing is further adjusted in response to a third condition.

20. The method of claim 16, where the first timing includes providing spark to a cylinder of the engine during a power stroke of the cylinder, and the method further comprising transitioning from providing spark to the cylinder during the power stroke of the cylinder to a timing advanced of MBT spark timing in response to a third condition.

\* \* \* \* \*